Feb. 19, 1963

J. NOALL 3,077,918

TIRE BUILDING DRUM

Filed Feb. 12, 1960

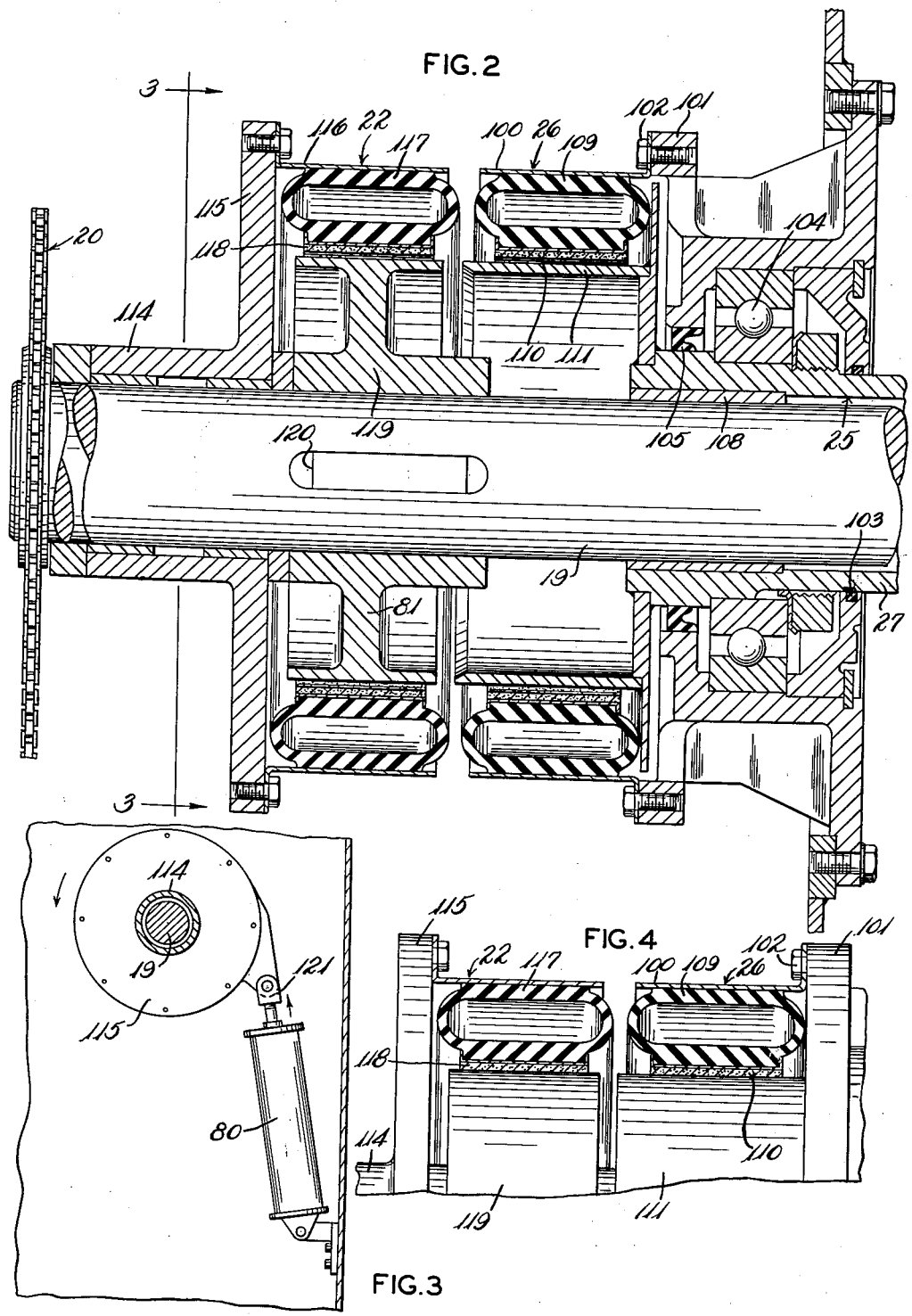

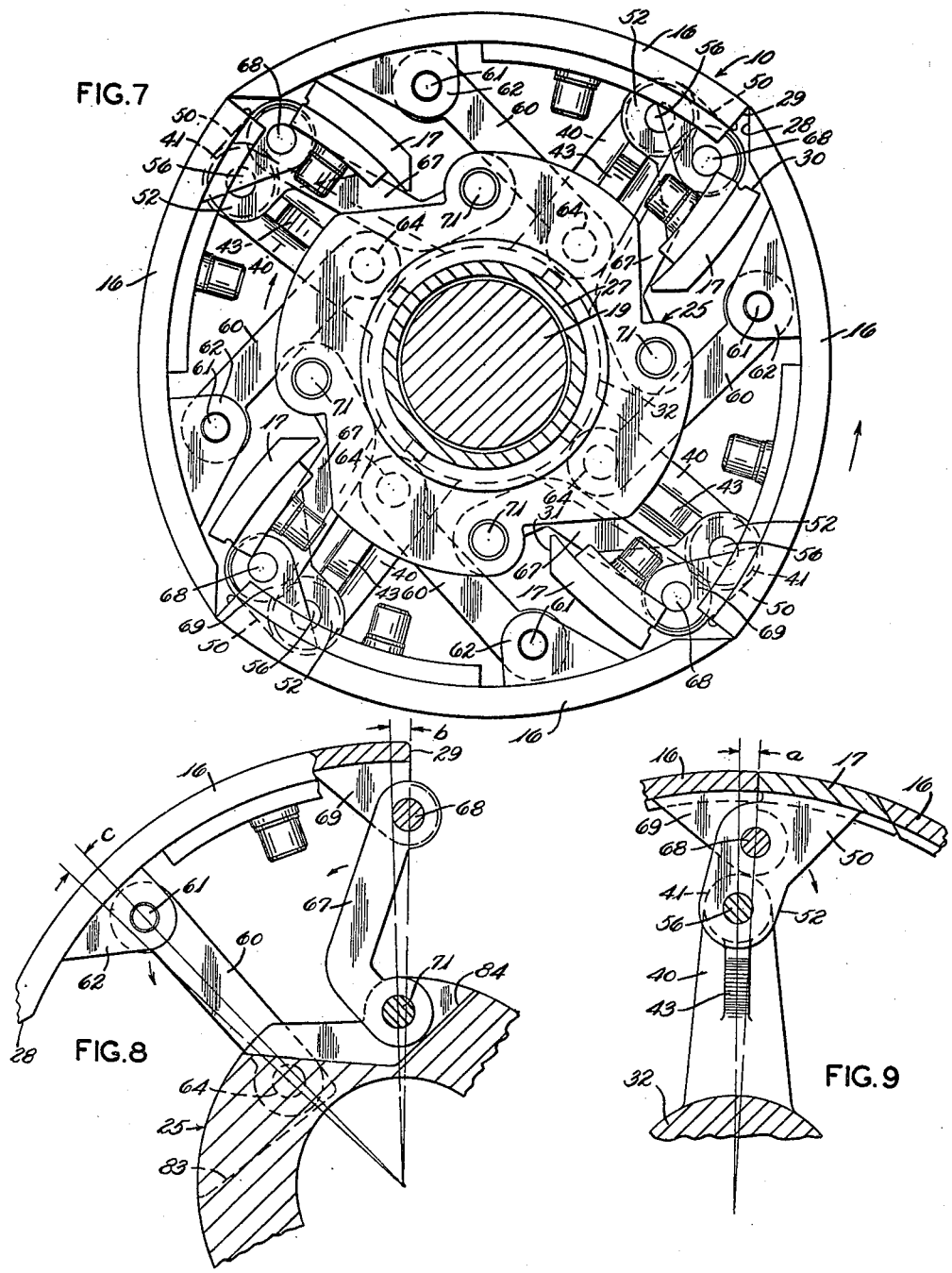

United States Patent Office 3,077,918
Patented Feb. 19, 1963

3,077,918
TIRE BUILDING DRUM
John Noall, Cuyahoga Falls, Ohio, assignor to The Firestone Tire & Rubber Company, Akron, Ohio, a corporation of Ohio
Filed Feb. 12, 1960, Ser. No. 8,360
2 Claims. (Cl. 156—420)

This invention relates to tire building drums and more particularly to collapsing mechanisms for tire building drums of the segmented type.

In order to remove an unvulcanized tire band from a tire building drum, the drum must be radially collapsed so that it will have a reduced diameter. This reduction in diameter permits axial telescoping of the unvulcanized tire band off of the building drum.

In the preferred embodiment of the present invention braking mechanism is provided to slow or stop rotation of a shaft on which some of the peripheral segments of the drum are supported by radially articulated links. In combination with this mechanism a second brake is provided to independently slow or stop a sleeve telescoped over and latched to the shaft, the sleeve also supporting the balance of the peripheral drum segments on radially articulated links. An alternate drive mechanism is provided in a modification of the invention to cooperate with the second brake to collapse the drum when the shaft is not turning.

It is accordingly a general object of the invention to provide an improved tire building drum. A further object is to provide a tire building drum which can be collapsed to enable the tire to be readily removed therefrom. Another object of the invention is to provide mechanism for slowing rotation of a tire building drum. Yet another object is to provide means to brake independently various elements of a tire building drum in order to collapse it radially inwardly. Yet a further object of the invention is to provide means for imparting relative turning rates to a shaft and a sleeve telescoped thereover in order to articulate radially protruding links supporting peripheral segments of a tire building drum.

These and other objects and advantages will be more fully apparent from the following description of a preferred form of invention, reference being had to the accompanying drawings in which:

FIGURE 2 is an enlarged fragmentary section view of the brake mechanism and related parts shown at the left side of FIGURE 1.

FIGURE 3 is a fragmentary side view partially in section of the auxiliary drive of the invention.

FIGURE 4 is a fragmentary section view of the brake mechanism of FIGURE 2.

FIGURE 7 is a view similar to FIGURE 5 showing the drum in fully collapsed position.

FIGURE 8 is a somewhat diagrammatic, fragmentary view showing the swing arms for one of the large segments which make up the shell of the building drum and the manner in which it is connected to the drum.

FIGURE 9 is a view similar to FIGURE 5 showing the linkage for supporting and moving one of the small segments which make up the shell of the building drum.

Figure 1:
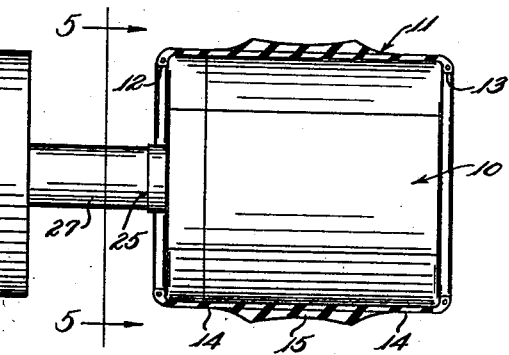
FIGURE 1 is a side elevation, partly in section, of a tire building drum embodying the present invention, the drum being shown with its parts in fully expanded position and with an unvulcanized tire band assembled thereon.

Now referring first to FIGURE 1 of the drawings, a tire building drum indicated generally at 10, embodying the present invention, is shown as comprising a cylindrical form providing support for the assembly of the various components which form an unvulcanized passenger tire band 11. Such a tire band generally comprises a plurality of rubberized fabric plies which are assembled on the drum to form the tire body. The ends of the plies are turned radially in and over the shoulders of the drum and are wrapped about and anchored to inextensible cores to form the beads 12 and 13. Sidewalls 14—14 and a tread portion 15 complete the unvulcanized tire band which is later removed from the building drum and shaped and vulcanized into the finished tire.

After the tire band 11 is completely assembled, the drum 10 must be collapsed to a smaller diameter to enable the inner bead 12 to be slipped over the collapsed drum and the band to be stripped from the drum for the subsequent vulcanizing operation.

The drum 10 may be comprised of a number of different conventional arrangements of links, shell sections and the like and these arrangements will work very well with the mechanism of the present invention. However, in the arrangement shown, the drum 10 comprises an outer shell formed by eight segmental portions consisting of four large segments 16 alternating respectively with four smaller segments 17. Each of the large segments 16 extends over approximately 70° of arc while each of the small segments extends over approximately 20° of arc. In the expanded condition of the drum, the eight segments fit tightly together and provide a substantially unbroken cylindrical drum surface. These segments and the linkage mechanism which connects them to the building drum will be described in detail later.

The drum has a hub 18 mounted on a cantilever shaft 19 (FIGURE 10), which is supported and driven by a suitable drive means, indicated generally at 20 (FIGURE 1), the details of which form no part of this invention. A brake 22 is provided to stop the rotation of shaft 19. As part of the linkage mechanism previously referred to, there is provided an actuating member 25 which is mounted on and which is normally driven by the hub 18 but which, when necessary, can be independently braked as by a brake 26 which acts upon the tubular extension 27 of the member 25.

Figure 5:
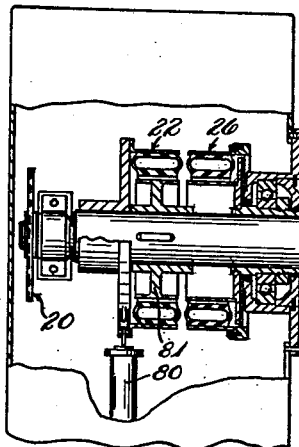
FIGURE 5 is a sectional view of the building drum of FIGURE 1, the section being taken in the radial plane indicated by the lines 5—5 in FIGURE 1 and being on an enlarged scale to show the details of the construction, the tire not being shown in this view.

It should be understood that the drum 10 may be rotated in either direction but that it is intended to rotate counterclockwise during the tire building operation as indicated by the arrows in FIGURES 5 and 7. Accordingly, the chamfered edges 28 of the large segments 16 will be referred to as the leading or forward edges while the blunt edges 29 will be referred to as the trailing edges. Likewise, the edges 30 of the small segments will be referred to as the leading or forward edges and the chamfered edges 31 will be referred to as the trailing edges.

Before discussing the specific mechanisms by which the drum segments are supported and operated, the hub 18 and the actuating member 25 will be described since these two parts provide the ultimate support for the segments 16 and 17 and produce the required mechanical actions which result in the collapse and expanding movements of the drum. These parts are best shown in FIGURE 10.

Figure 10:
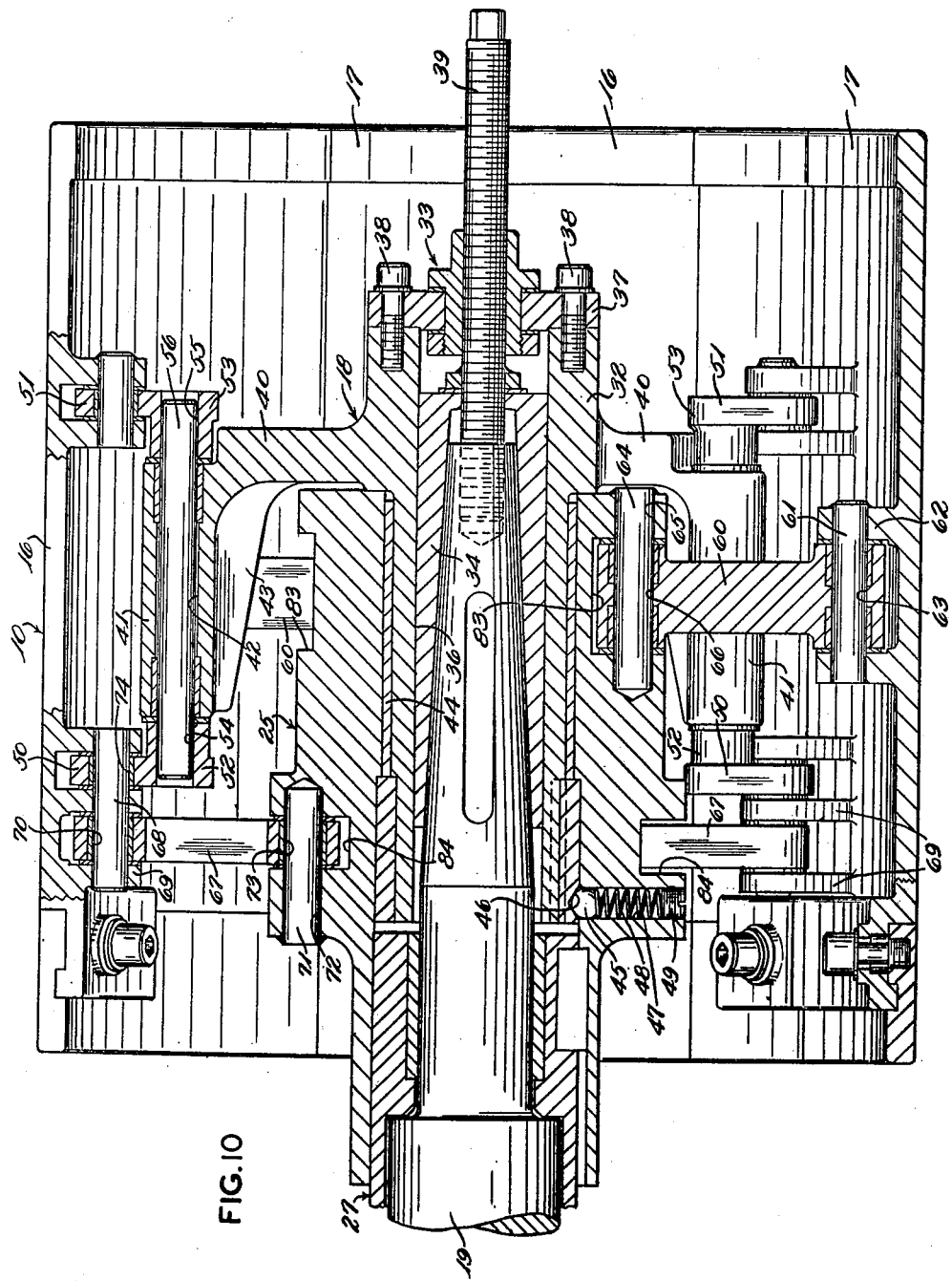
FIGURE 10 is a longitudinal sectional view of the building drum, the section being taken in the plane indicated by the lines 10—10 in FIGURE 5.

The hub 18 comprises a body portion 32 which is secured to the drive shaft 19 by the arrangement indicated generally at 33 in FIGURE 10. The arrangement is conventional and will not be described in detail for it forms no part of the present invention. Essentially, it comprises a tapered sleeve 34 which is forced in a wedging action between the tapered end of the shaft 19 and the bore 36 of the hub. A ring member 37 which is secured to the end of the hub as by bolts 38 holds the hub onto the threaded extension 39 of the drive shaft. The arrangement permits the drum to be adjusted longitudinally on the shaft and enables it to be readily mounted on and removed from the shaft. Four radial arms or spokes 40 extend out from the body of the hub terminating at their outer ends in axially extending tubular portions 41 of substantial length. The portions 41 each have a longitudinal bore 42 and they are supported by underlying stiffening ribs 43 which are braced against the supporting spokes 40.

The actuating member 25 comprises a thick-walled sleeve having an internal bearing 44 which is journaled on the hub 18 just inboard of the radial spokes 40, see FIGURE 10. During normal operation of the drum, the actuating member rotates with the hub, being releasably engaged with the hub by four equally spaced ball detents 45 which fit within radial bores 47 in the wall of the actuating member and which project inwardly to seat in conical seats 46 in the outer bearing surface of the hub. The balls are urged inwardly into the depressions by coil springs 48 which are compressed between the balls and threaded screws 49 which can be adjusted to control the force exerted by the springs. The ball dentents provide a sufficient interlock between the actuating member 25 and the hub 18 so that for all normal operations of the drum, the two will rotate together. There is little or no tendency during normal operation of the drum in the tire building operation to exert enough torque upon the drum segments to overcome the ball detents, and, as will be explained later, the linkages which support the outer drum segments are designed to resist accidental or inadvertent collapse of the drum. The ball detents, however, can be disengaged by braking the actuating member and positively driving the hub thereby permitting the actuating member to rotate on the hub to effect the collapsing and expanding movements of the drum. It is possible, too, to brake the actuating member while the hub and segments are rotating and utilize the rotational inertia of the parts to disengage the ball detents and operate the drum.

The drum segments 16 and 17 are connected to the hub 18 and to the actuating members 25 by linkages which are identical for like segments, and which link each large segment to its adjacent, trailing small segment so that the two will operate in conjunction with each other. Thus each small segment 17 has a pair of longitudinally spaced extensions 50 and 51 (FIGURE 9) which project radially inwardly to terminate in enlarged end portions 52 and 53, respectively. These end portions have axially aligned bores 54 and 55 and the axial spacing of the end portions 50 and 51 is such as to enable them to straddle the axial portions 41 of the spokes 40 and to bring their bores into alignment with the bores 42. Longitudinally extending pivot pins 56 extending through the aligned bores of the axial portion and the ends 52 and 53 of the segment extensions hinge the small segments to the hub. As will be apparent later, the radial inward articulation of the small segments takes place by swinging inwardly around the pivot pins 56, but this swinging movement can take place only in conjunction with and it is produced by a corresponding movement of the adjacent large segment.

Figure 6:
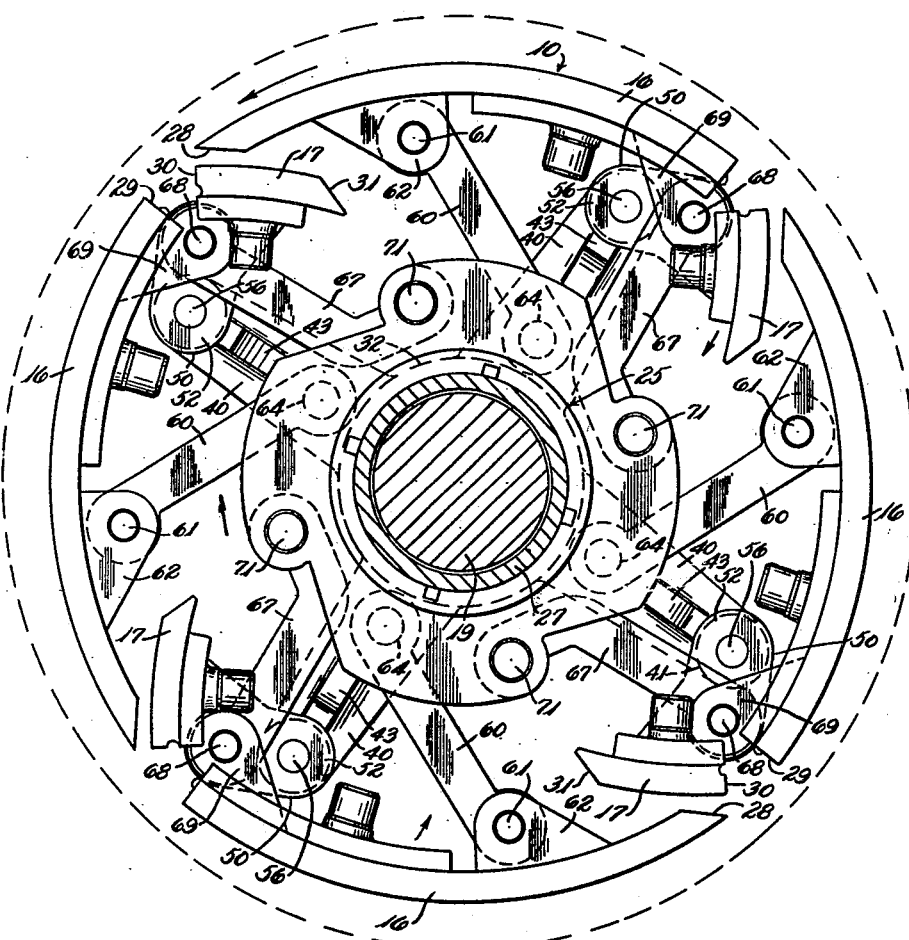
FIGURE 6 is a view similar to FIGURE 5 showing the drum with its parts in a position of partial collapse.

Each large segment 16 is connected adjacent its forward edge to the actuating member 25 by a straight arm 60 (FIGURE 8) which is pivoted at its outer end to the segment by a pin 61 which extends through a boss 62 cast integrally into the large segment and through a bore 63 in the outer end of the arm. The straight arm 60 is pivoted at its inner end to the actuating member 25 by a pin 64 passing into a hole 65 drilled axially in the actuating member and through a bore 66 in the radially inner end of the straight arm (FIGS. 5 and 10). The trailing end portion of each large segment 16 is connected to the actuating member by a curved arm 67 which is pivoted at its outer end to the segment by a pin 68, which passes through a boss 69 cast integrally in the large segment and through a bore 70 in the outer end of the curved arm. The curved arm 67 is pivoted at its inner end to the actuating member by a pin 71 which passes into a hole 72 drilled axially into the actuating member 25 and through a bore 73 in the inner end of the curved arm, see FIGURES 6 and 10.

As mentioned above, the drum is collapsed by producing a relative turning rate between the hub 18 and the actuating member 25. This is accomplished by applying the brake 26 to slow or to hold the actuating member stationary while the drum is rotating in the direction indicated by the arrows in FIGURES 5 and 7. The shaft 19 need not be positively driven at this moment but it should be rotating at such speed that the shaft, the hub, the segments and their connecting linkages will possess sufficient rotational energy to disengage the ball detents and rotate with respect to the actuating member 25 to effect complete collapse of the drum. Normal drum speeds will be sufficient to accomplish this.

As this relative rotation takes place, each large segment 16 will swing forward and radially inwardly on the arms 60 and 67 about the pins 64 and 71, respectively, as pivot points. As this inward movement of the large segments takes place, the pins 68 move inwardly and cause the adjacent small segments 17 to swing radially inwardly by pivoting about the pins 56. At the end of the collapsing movement, the small segments will have taken the position indicated in the FIGURE 7.

Referring to FIGURES 2, 3 and 4, the brake 26 is comprised of a housing 100 bolted to a flange 101 by bolts such as 102. The machine frame to which brake housing 100 is bolted provides a journal for shaft 19 and sleeve 25. Sleeve 25 is rotatably supported in the frame by roller bearing 104 held in position by retainer 102 and properly sealed off by rubber seals 103 and 105. The sleeve 25 is supported with respect to the shaft 19 by a bronze bushing 108. In the preferred form of the invention, the brake itself comprises a rubber bag 109 to which air under pressure may be introduced by conventional means not shown in order to press shoe 110 radially against a metal drum 111 which is mounted as by welding on sleeve 25. This brake is similar to Fawick Air-Ring Clutch Type CB sold by the Fawick Air Flex Company, Inc., Cleveland, Ohio.

Brake 22 may be similar to brake 26 and controls rotation of shaft 19. This control is attained through gland 114 having an integral flange 115 journaled on bushings on shaft 19. Brake housing 116 is bolted to flange 115. Rubber bag 117 is inflatable in a manner similar to the inflation of bag 109 and when so inflated presses shoe 118 against the surface of metal flange 119 anchored to shaft 19 by key 120.

Actuation of brake 26 shows or stops the turning of sleeve 25 irrespective of the turning of shaft 19. Likewise, actuation of brake 22 slows or stops the turning of shaft 19 and if the inertia of sleeve 25 and its related parts is great enough, detents 45 are freed from their seats so that sleeve 25 continues to turn while the shaft stops.

In the preferred modification of the invention a fluid cylinder 80 is mounted by clevis 121 to flange 115. In the event that it is desired to break down the tire building drum when it is at a stopped position; i.e. the shaft 19 not turning, both airbag 109 and 117 are inflated to lock both the shaft 19 and the sleeve 25. The fluid cylinder is actuated and flange 115 is turned about 80°. Since sleeve 25 is locked, this turning action twists gland 114, housing 116 bodily. Shaft 19 and its related parts retract segments 17 to break down the tire building drum.

In normal operation the flanged member 81 will not be operatively connected with the air cylinder but will be connected to it for operation whenever it is desired to collapse the drum. Alternatively, the drum may be collapsed by stopping the hub 18 as by the brake 22 and permitting the operating member 25 to rotate and disengage itself from the shaft. The expansion of the drum from its collapsed position may be effected by any of the other members. For example, the collapsed drum may be rotated in the clockwise position as viewed in FIGURE 7 and with considerable speed so that the parts will require rotational energy and at this moment the actuating member may be braked at which time the large segments 16 will swing outwardly on their swing arms carrying the small segments from their retracted position until the complete cylindrical surface, FIGURE 2, is formed. Expansion of the drum may be effected carrying out in reverse any of the collapsing processes.

The details of construction by which the swing arms 60 and 67 are connected to the actuating member 24 and to the segments 16 and 17 do not form an important part of the invention. In the present example, the actuating member 25 is preferably notched lengthwise, as shown in FIGURE 5, and is also provided with circumferentially extending notches as indicated at 83 and 84 in FIGURE 10, to receive the inner ends of the arms 60 and 67, respectively, and to provide room to enable the arms to complete their required swinging movements. See also FIGURES 8 and 9.

As noted above, in the collapsed condition of the drum, the large segments 16 form a closed surface which in section is in the form of a quadrangle with sides of considerable curvature, see FIGURE 4. This surface is sufficiently continuous to enable the tire to be stripped from the drum without its catching on projecting points or edges.

Various modifications and changes no doubt will suggest themselves to those skilled in the art without departing from the scope of the invention the essential features of which are summarized in the appended claims.

What is claimed is:

1. A collapsible tire building drum comprising a hub and an outer shell, said outer shell comprising a plurality of relatively large segments alternating with a like number of relatively small segments, means connecting said segments to said hub including a sleeve on said hub, a plurality of arms pivotally mounted on said sleeve and pivotally connected in pairs to said large segments respectively, a plurality of spokes extending radially from said hub, means pivotally connecting all of said small segments to said spokes, means linking one of each of said arms of each large segment to an adjacent small segment whereby each said large segment moves simultaneously with its linked small segment, independent brake means for each said sleeve and said hub, means providing relative movement between said sleeve and said hub in one direction to move all of said large segments on their arms radially outwardly to expanded positions and to pivot all of said small segments on said spokes radially outwardly to expanded positions between said large segments and means providing relative movement between said sleeve and said hub in the opposite direction to pivot said small segments radially inwardly and to move all of said large segments radially inwardly until their adjacent end edges abut to form a closed surface totally enclosing said small segments.

2. A collapsible tire building drum comprising a hub and an outer shell, said outer shell comprising a plurality of relatively large segments alternating with a like number of relatively small segments, means connecting said segments to said hub including, a sleeve on said hub, a plurality of arms pivotally mounted on said sleeve and pivotally connected in pairs to said large segments, respectively, a plurality of spokes extending radially from said hub, means pivotally connecting all of said small segments to said spokes, means linking one of each of said arms of each large segment to an adjacent small segment whereby each said large segment moves simultaneously with its linked small segment, means releasably engaging said sleeve to said hub to rotate therewith during normal operation of said drum, drive means for said hub, independent braking means for each said hub and said sleeve providing over-riding means for said releasable engaging means and providing relative movement between said sleeve and said hub in one direction to move all of said large segments on their arms radially outwardly to expanded positions and to pivot all of said small segments on said spokes radially outwardly to expanded positions between said large segments and conversely providing relative movement between said sleeve and said hub in the opposite direction to pivot said small segments radially inwardly to retracted positions and to move all of said large segments radially inwardly until their adjacent edges abut to form a closed surface enclosing said small segments.

References Cited in the file of this patent

UNITED STATES PATENTS

| | | |
|---|---|---|
| 1,877,746 | Heston | Sept. 13, 1932 |
| 2,514,215 | Stevens | July 4, 1950 |